United States Patent
Choi et al.

(10) Patent No.: US 10,665,106 B2
(45) Date of Patent: May 26, 2020

(54) METHOD AND DEVICE FOR CONTROLLING DRIVING BASED ON SENSING INFORMATION

(71) Applicant: SAMSUNG ELECTRONICS CO., LTD., Suwon-si, Gyeonggi-do (KR)

(72) Inventors: Mid-eum Choi, Seoul (KR); Chang-soo Park, Yongin-si (KR); Jeong-eun Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 53 days.

(21) Appl. No.: 15/938,137

(22) Filed: Mar. 28, 2018

(65) Prior Publication Data

US 2018/0286248 A1   Oct. 4, 2018

(30) Foreign Application Priority Data

Mar. 31, 2017   (KR) .................. 10-2017-0041931

(51) Int. Cl.
| | |
|---|---|
| *G08G 1/16* | (2006.01) |
| *B60W 10/30* | (2006.01) |
| *B60W 30/09* | (2012.01) |
| *G05D 1/02* | (2020.01) |
| *G06K 9/00* | (2006.01) |
| *G05D 1/00* | (2006.01) |

(52) U.S. Cl.
CPC ............ *G08G 1/166* (2013.01); *B60W 10/30* (2013.01); *B60W 30/09* (2013.01); *G05D 1/0214* (2013.01); *G06K 9/00805* (2013.01); *G06K 9/00825* (2013.01); *G08G 1/167* (2013.01); *B60W 2550/308* (2013.01); *B60W 2720/10* (2013.01); *B60W 2720/24* (2013.01); *G05D 1/0088* (2013.01); *G05D 2201/0212* (2013.01)

(58) Field of Classification Search
USPC .......................................................... 701/23
See application file for complete search history.

(56) References Cited

U.S. PATENT DOCUMENTS

| | | | |
|---|---|---|---|
| 8,520,695 B1 * | 8/2013 | Rubin .................. | G08G 9/02 370/445 |
| 9,168,867 B2 | 10/2015 | Tamatsu et al. | |

(Continued)

FOREIGN PATENT DOCUMENTS

| | | |
|---|---|---|
| EP | 1 865 479 | 12/2007 |
| EP | 2 953 113 | 12/2015 |

(Continued)

OTHER PUBLICATIONS

Search Report dated Jul. 5, 2018 in counterpart International Patent Application No. PCT/KR2018/003582.

(Continued)

*Primary Examiner* — Tyler D Paige
(74) *Attorney, Agent, or Firm* — Nixon & Vanderhye P.C.

(57) ABSTRACT

Provided is a method of controlling driving, based on sensing information, the method being performed, for example, by a device included in an object and including: obtaining sensing information; determining a sensing blind zone in a sensing zone based on the sensing information; generating a control signal based on the sensing blind zone; and controlling driving of the object using the control signal.

20 Claims, 14 Drawing Sheets

(56) References Cited

U.S. PATENT DOCUMENTS

| | | | |
|---|---|---|---|
| 9,196,164 B1 | 11/2015 | Urmson et al. | |
| 9,230,442 B2 | 1/2016 | Bowers et al. | |
| 2009/0037104 A1* | 2/2009 | Basson | G01C 21/20 |
| | | | 701/431 |
| 2012/0136510 A1 | 5/2012 | Min et al. | |
| 2015/0039218 A1* | 2/2015 | Bowers | B60W 30/0956 |
| | | | 701/301 |
| 2018/0286248 A1* | 10/2018 | Choi | G08G 1/166 |

FOREIGN PATENT DOCUMENTS

| | | |
|---|---|---|
| JP | 2006-209325 | 8/2006 |
| JP | 2013-186722 | 9/2013 |
| JP | 2013-186723 | 9/2013 |
| KR | 10-2012-0059109 | 6/2012 |
| KR | 10-1399026 | 5/2014 |
| KR | 10-1433916 | 8/2014 |
| KR | 6069938 | 2/2017 |
| WO | WO 2013/186620 | 12/2013 |

OTHER PUBLICATIONS

Written Opinion dated Jul. 5, 2018 in counterpart International Patent Application No. PCT/KR2018/003582.
European Search Report dated Dec. 3, 2019 for EP Application No. 18776290.1.

\* cited by examiner

METHOD AND DEVICE FOR
CONTROLLING DRIVING BASED ON
SENSING INFORMATION

CROSS-REFERENCE TO RELATED APPLICATION

This application is based on and claims priority under 35 U.S.C. § 119 to Korean Patent Application No. 10-2017-0041931, filed on Mar. 31, 2017, in the Korean Intellectual Property Office, the disclosure of which is incorporated by reference herein in its entirety.

BACKGROUND

1. Field

The disclosure relates to a method, device, and system for controlling driving using sensing information.

2. Description of Related Art

Recently, due to convergence of information communication technologies and car industries, cars have rapidly become smart. Accordingly, a car has evolved from a simple mechanism to a smart car, and in particular, driving control technology using at least one sensor of a car is highlighted as a core technology of smart cars. Various sensors are mounted in a smart car, and the smart car obtains, using the sensors, various types of sensing information to provide convenience and safety to a user, and controls driving or assists with driving control using the sensing information.

However, not all information in a sensing-target zone can be obtained by the sensors mounted in the smart car. For example, in the case where a certain zone is obstructed by a building or another car, the sensors mounted in the smart car may not be able to detect or identify objects in the obstructed zone. Thus, there may be an increased risk of accident due to a zone that is not detectable by the sensors.

Accordingly, there is demand for a method of decreasing uncertainty and risk even in a zone from which a sensor cannot obtain information.

SUMMARY

According to example embodiments, provided is a method of controlling driving to avoid risk and increase safety.

Additional aspects will be set forth in part in the description which follows and, in part, will be apparent from the description, or may be learned by practice of the presented embodiments.

In accordance with an aspect of the disclosure, a method, performed by a device included in an object, of controlling driving, based on sensing information, includes obtaining sensing information; determining a sensing blind zone in a sensing zone, based on the sensing information; generating a control signal, based on the sensing blind zone; and controlling driving of the object using the control signal.

The determining of the sensing blind zone may include determining, based on the sensing information, a position and a characteristic of at least one partial zone in the sensing zone, wherein information cannot be obtained from the at least one partial zone; and determining the at least one partial zone to be the sensing blind zone, based on a result of the determining.

The generating may include generating the control signal, based on a position of the sensing blind zone and a characteristic of the sensing blind zone.

The controlling of the driving of the object may include controlling at least one of a speed of the object, a direction of the object, a path of the object, a direction of at least one lamp of the object, an angle of the at least one lamp, and intensity of the at least one lamp by providing an alarm message generated using the control signal.

The method may further include receiving, from another object, sensing information of the other object, and the generating of the control signal may include generating the control signal, based on a result of the determining and the sensing information of the other object.

The sensing information of the other object, which is obtained by the other object, may include information about the sensing blind zone.

The method may further include transmitting, to the other object, the sensing information obtained by the device.

The method may further include obtaining situation information from an external device, and the generating of the control signal may include generating the control signal, based on the sensing blind zone and the situation information.

The method may further include estimating a movement trajectory of the object, based on the sensing information; and providing alarm information to the object, based on information about the movement trajectory.

The estimating may include detecting the object, based on the sensing information; obtaining information about a position of the detected object; and predicting the movement trajectory of the object, based on the information about the position.

In accordance with another aspect of the disclosure, a non-transitory computer-readable recording medium includes a program recorded thereon for executing the method using a computer.

In accordance with another aspect of the disclosure, a device controlling driving of an object, based on sensing information, includes a sensing unit comprising sensing circuitry configured to obtain sensing information; and a processor configured to determine a sensing blind zone in a sensing zone, based on the sensing information, to generate a control signal, based on the sensing blind zone, and to control driving of the object using the control signal.

The processor may be further configured to determine, based on the sensing information, a position and a characteristic of at least one partial zone in the sensing zone, wherein information cannot be obtained from the at least one partial zone, and to determine the at least one partial zone to be the sensing blind zone, based on a result of the determination.

The processor may be further configured to generate the control signal, based on a position of the sensing blind zone and a characteristic of the sensing blind zone.

The device may further include an output unit comprising output circuitry, and the processor may be further configured to control at least one of a speed of the object, a direction of the object, a path of the object, a direction of at least one lamp of the object, an angle of the at least one lamp, and intensity of the at least one lamp by providing an alarm message generated using the control signal via the output unit.

The device may further include a communication interface comprising communication circuitry configured to receive, from another object, sensing information of the other object, and the processor may be further configured to generate the control signal, based on a result of the determination and the sensing information of the other object.

The sensing information of the other object, which is obtained by the other object, may include information about the sensing blind zone.

The communication interface may be further configured to transmit, to the other object, the sensing information obtained by the device.

The device may further include a communication interface comprising communication circuitry configured to obtain situation information from an external device, and the processor may be further configured to generate the control signal, based on the sensing blind zone and the situation information.

The device may further include a communication interface communication circuitry; and an output unit comprising output circuitry, and the processor may be further configured to control the communication interface and the output unit to estimate a movement trajectory of the object, based on the sensing information, and to provide alarm information to the object, based on information about the movement trajectory.

The processor may be further configured to detect the object, based on the sensing information, to obtain information about a position of the detected object, and to predict the movement trajectory of the object, based on the information about the position.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
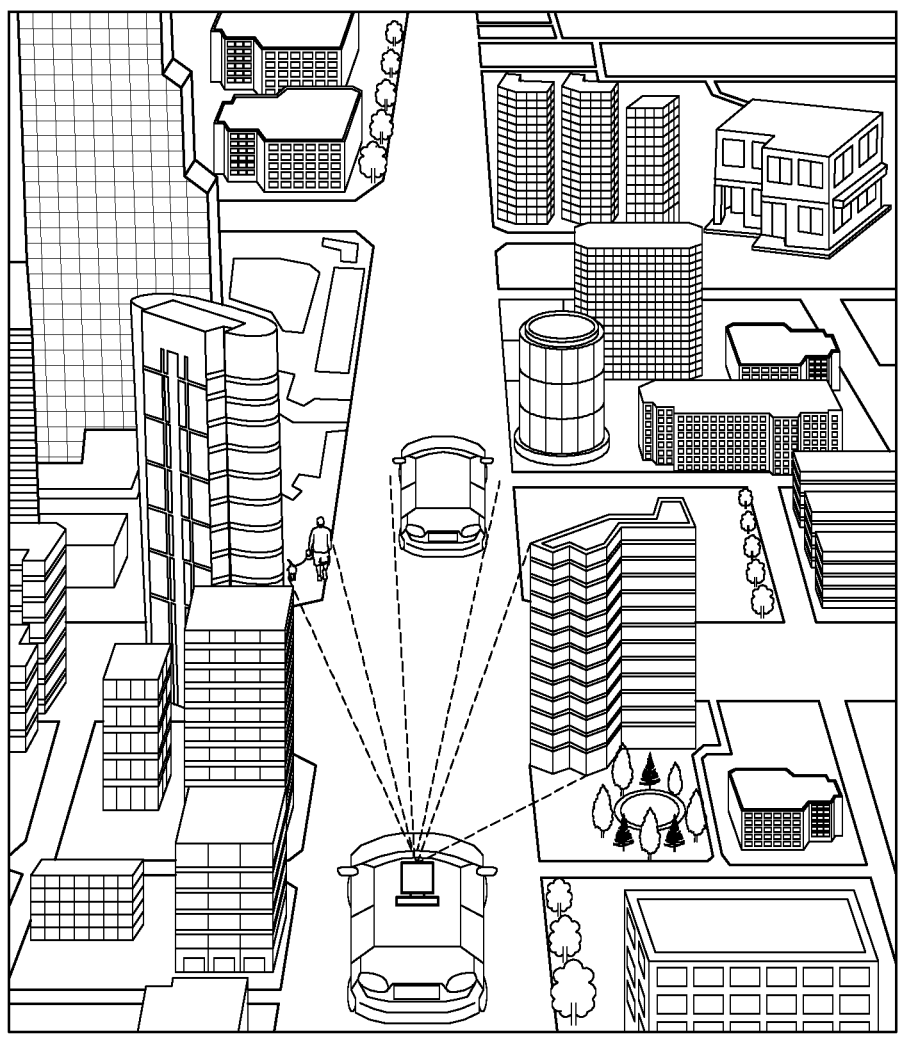
FIG. 1 is a diagram related to a method of providing alarm information using a sensor mounted in a car.

All terms including descriptive or technical terms which are used herein should be understood as having meanings that are apparent to one of ordinary skill in the art. However, the terms may have different meanings according to an intention of one of ordinary skill in the art, precedent cases, or the appearance of new technologies. Also, some terms may be arbitrarily selected, and in this case, the meaning of the selected terms will be described in detail in the detailed description. Thus, the terms used herein are defined based on the meaning of the terms together with the description throughout the specification.

Throughout the disclosure, it will also be understood that when an element is referred to as being "connected to" or "coupled with" another element, it can be directly connected to or coupled with the other element, or it can be electrically connected to or coupled with the other element by having an intervening element interposed therebetween. Throughout the disclosure, terms such as "unit" and "module" may refer, for example, to a unit for processing at least one function or operation, wherein the unit and the module may be embodied as hardware or software or embodied by combining hardware and software.

Throughout the disclosure, an apparatus or a device may include, but is not limited to, a personal computer (PC), a mobile phone, a smartphone, a television (TV), a tablet computer, a notebook, a personal digital assistant (PDA), a portable multimedia player (PMP), navigation, an MP3 player, a digital camera, a refrigerator, a washing machine, a vacuum cleaner, a sensor, and a device mounted in a car, or the like, but is not limited thereto.

Throughout the disclosure, an object may refer to a car or a pedestrian, and may include, but is not limited to, animals, robots, movable smart devices, or the like.

Throughout the disclosure, a sensing zone may refer, for example, to a zone that may be sensed using at least one sensor. That is, the sensing zone may refer to the zone that may be sensed using a sensor, from which the sensor may obtain information about an object or information about surroundings. The sensing zone may be divided into a plurality of zones or may be one zone, and a size and range of the sensing zone may vary depending on the number of sensors, a type of each sensor, and a position of each sensor. The present disclosure is not limited thereto.

Throughout the disclosure, a sensing blind zone may refer to a zone that is obstructed by, for example, and without limitation, a building, infrastructure, or another object, or the like, or may refer to a zone that is included in the sensing zone but from which sensing information cannot be obtained due to occurrence of an error in a sensor, a delay in obtaining the sensing information, or the like.

Throughout the disclosure, sensing information may refer, for example, to information obtained using a sensor. For example, the sensing information may include object information that is information about an object within a preset range, and driving information. However, the present disclosure is not limited thereto, and may include all types of information obtained using at least one sensor. In addition, the sensing information may include, for example, and without limitation, information about the sensing blind zone, the information including a position, a range, or the like of the sensing blind zone.

Throughout the disclosure, object information may include information about a position of an object, a shape of the object, a movement direction of the object, a speed of the object, or a type of the object. That is, the object information may include all types of information including, without limitation, information about the object obtained by the sensor, information determined based on the obtained information about the object, or the like. The object information may include, for example, and without limitation, all types of information about the object obtained by the sensor, information identified based on the obtained information about the object, or the like. For example, and without limitation, the object information may be an image of the object, or a type of the object which is determined based on the image of the object, or the like. However, the present disclosure is not limited thereto. Throughout the disclosure, a characteristic of the sensing blind zone may include, but is not limited to, a size of the sensing blind zone and a shape of the sensing blind zone. In addition, a characteristic of the sensing zone may include, but is not limited to, a size of the sensing zone and a shape of the sensing zone.

Throughout the disclosure, driving information may include, but is not limited to, information about a speed, a direction, a path, and a trajectory of a device, and information about a direction, intensity, and an angle of at least one lamp, or the like.

Throughout the disclosure, a device may include, for example, and without limitation, an object, or the device may be included in the object, may be carried by the object, may be equipped in the object, or may be mounted in the object, or the like. In addition, the device may be, for example, and without limitation, an apparatus, a server, a sensor, a control device, or a mobile device which is included in the object, or the like. In this regard, the object may be a car, but the present disclosure is not limited thereto.

Throughout the disclosure, the information about a position of the object may include, but is not limited to, the position of the object, a change in the position of the object, a relation between the position of the object and a time, a movement distance of the object, a movement path of the object, or the like.

Throughout the disclosure, situation information may include, for example, and without limitation, information about a change in a situation, and information about a current situation. For example, information about when a traffic light is to turn red or about a current color of the traffic light may be referred to, for example, as the situation information, and may include information about a traffic condition or information about a current state of the object, or the like. The situation information may be provided from an external device to the object, but the present disclosure is not limited thereto. Thus, the object may provide the situation information to the external device, and the situation information may be exchanged between objects. In addition, the external device may directly obtain the situation information or may obtain the situation information from an external server. However, the present disclosure is not limited thereto.

According to some example embodiments, the external device may include, but is not limited to, infrastructure such as a traffic control device (e.g., a traffic light) and a satellite, or the like.

Throughout the disclosure, a sensor may include various sensing circuitry, such as, for example, and without limitation, a magnetic sensor, a position sensor, an acceleration sensor, an air pressure sensor, a temperature/humidity sensor, a proximity sensor, an infrared sensor, an RGB sensor, and a gyroscope sensor, or the like. In addition, the sensor may include, but is not limited to, a camera or an audio input unit including input circuitry such as a microphone, or the like.

Throughout the disclosure, prediction may refer, for example, to both prediction and estimation. In other words, throughout the disclosure, the prediction may include a previous determination on what is going to occur, based on data or information.

As used herein, the term "and/or" includes any and all combinations of one or more of the associated listed items. Expressions such as "at least one of," when preceding a list of elements, modifies the entire list of elements and does not modify the individual elements of the list.

FIG. 1 is a diagram illustrating a method of providing alarm information using a sensor mounted in a car. The car of FIG. 1 may have mounted therein at least one sensor such as, for example, and without limitation, a proximity sensor, a radar sensor, a camera, or the like, which is enabled to obtain various types of information.

The car may detect and identify objects within a sensing zone of the car using the mounted sensor. For example, the car may identify a person, a building, another car, etc. around the car within a preset range. That is, the car or a device that is mounted and thus is included in the car may detect and identify the objects within the sensing zone of the car.

However, in the case that a sensing blind zone exists in the sensing zone, the car may not be able to sufficiently obtain information about the sensing blind zone, such that an accident may happen during driving of the car.

Figure 2:
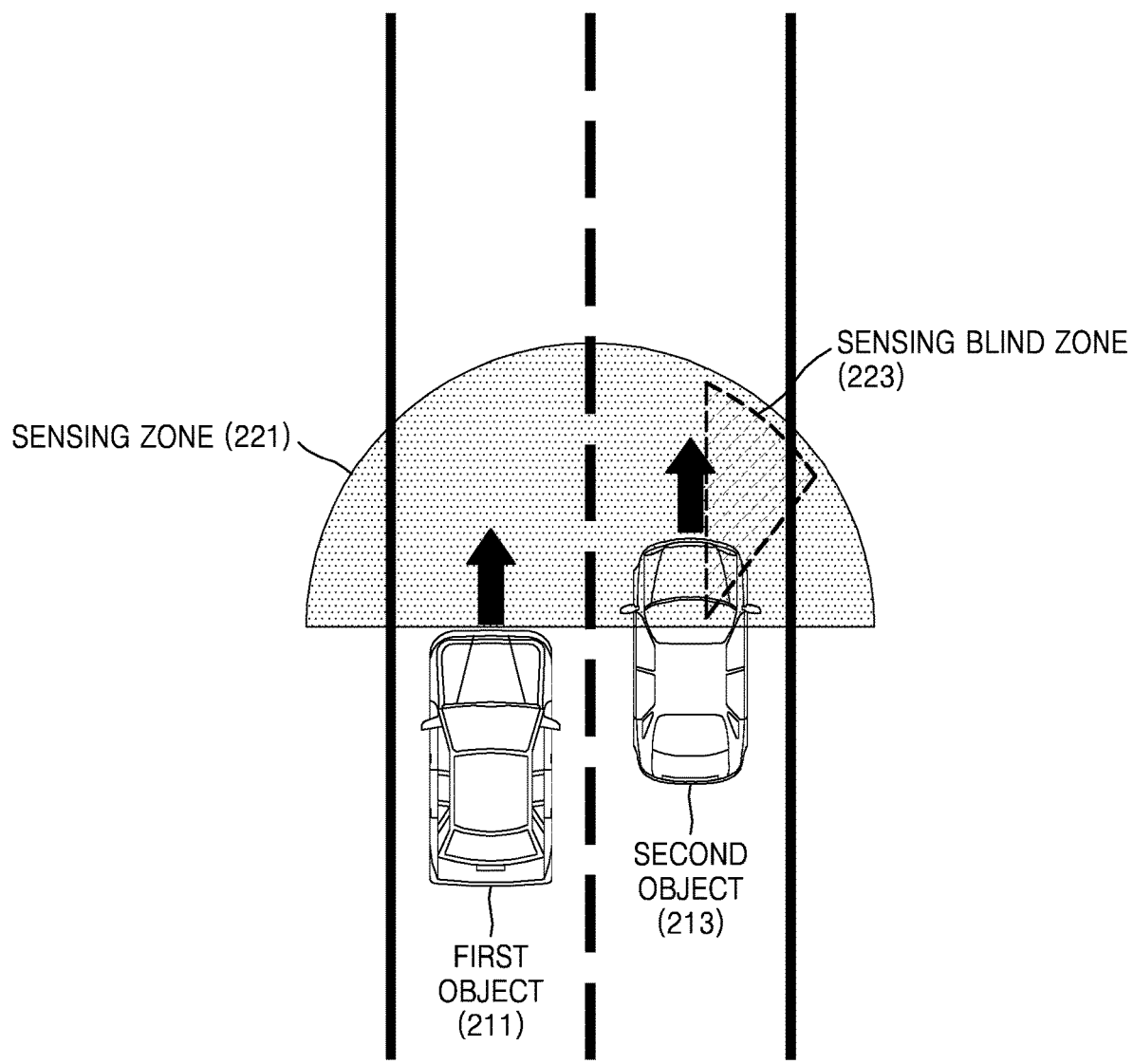
FIG. 2 is a diagram illustrating a concept of a sensing zone and a sensing blind zone, according to some embodiments.

FIG. 2 is a diagram illustrating a concept of a sensing zone and a sensing blind zone, according to some example embodiments.

According to some example embodiments, a first object 211 may include a sensor. The first object 211 may include a plurality of sensors, and there is no limit in the number of sensors or types of the sensors that may be included in the first object 211.

According to some embodiments, the first object 211 may be a car. The sensor included in the first object 211 may obtain sensing information from a sensing zone 221. The sensing zone 221 may refer, for example, to a zone that is detectable by the sensor. That is, the sensing zone 221 may indicate a zone from which the sensor may obtain information. In addition, the sensing zone 221 may indicate each of zones from which at least one sensor included in the first object 211 may obtain various types of information, or may indicate a sum of the zones from which at least one sensor included in the first object 211 may obtain various types of information.

The sensor included in the first object 211 may include, for example, and without limitation, a distance sensor configured to obtain information about a shape or position of an object. For example, the sensor may include, but is not limited to, a Time of Flight (ToF) sensor, a structured light sensor, an ultrasound sensor, an infrared sensor, and a laser sensor such as a light detection and ranging (LiDAR) sensor, or the like. The distance sensor may obtain the information about the shape or position of the object by emitting various waveforms of an ultrasound wave, infrared light, a laser, or the like and then receiving a waveform reflected from the object. In addition, the distance sensor may obtain the information about the shape or position of the object, or information about a distance to the object using a time propagation method of measuring a distance to an object based on a propagation time from a measurement point to the object, or a method of measuring a distance based on triangulation using light. The LiDAR sensor may include, but is not limited to, a multi-beam LiDAR sensor and a micromechanical system (MEMS)/optical phased array (OPA) LiDAR sensor, or the like.

However, even if the first object 211 uses the sensor, sensing information about a certain zone in the sensing zone 221 may not be obtained. For example, when the first object 211 is driving on a road, the first object 211 may pass by a second object 213. When the first object 211 obtains sensing information using the sensor, various waveforms of an ultrasound wave, a laser, infrared light, or the like which are output from the first object 211 to obtain the sensing information may be reflected, diffracted, or distorted due to presence and/or position of the second object 213.

Thus, even if the sensor included in the first object 211 can obtain sensing information from a left zone of the second object 213, the sensor cannot obtain sensing information from a right zone of the second object 213. That is, the sensing zone 221 of the first object 211 includes a zone from which the first object 211 cannot obtain sensing information due to predetermined reasons. The zone may, for example, be referred to as a sensing blind zone 223. In other words, the sensing blind zone 223 may be a blind zone to the sensor included in the first object 211.

The reason why the sensing blind zone 223 occurs is not limited to the above example, and as described above, the sensing blind zone 223 may occur due to a delay in obtaining the sensing information, occurrence of an error in the sensor, or the like.

Because the first object 211 cannot obtain information about the sensing blind zone 223, it is difficult for the first object 211 to predict what will happen in the sensing blind zone 223. For example, the first object 211 cannot obtain information about other objects moving in the sensing blind zone 223, thus, if an object suddenly appears from the sensing blind zone 223, there is a possibility of an accident such as a collision. That is, when the sensing blind zone 223 exists, uncertainty and a risk may increase.

Thus, in the case that the sensing blind zone 223 exists, an appropriate driving control may be necessary to increase safety.

Figure 3:
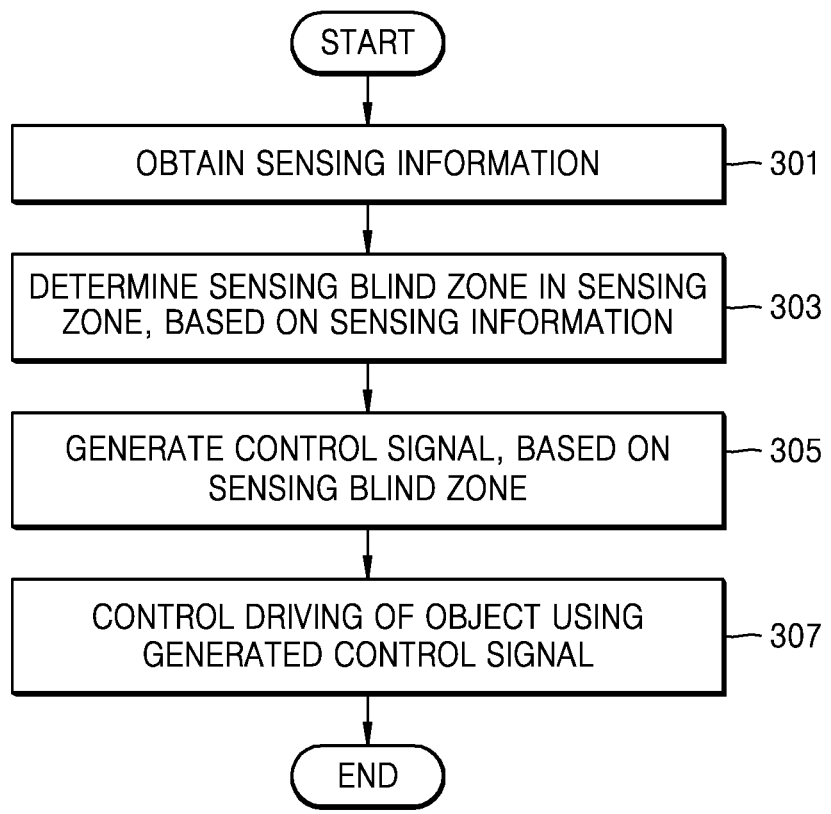
FIG. 3 is a flowchart illustrating a method of controlling driving, based on sensing information, according to some embodiments.

FIG. 3 is a flowchart illustrating a method of controlling driving, based on sensing information, according to some example embodiments.

In operation 301, a device may obtain sensing information. According to some embodiments, the device may obtain the sensing information using a sensor of the device. For example, the device may obtain, using, for example, and without limitation, a distance sensor, object information such as information about a shape of an object in a sensing zone, information about a distance to the object, or the like, and may obtain, using, for example, an acceleration sensor, driving information such as information about a speed of the object, information about a movement direction of the object, or the like. The present disclosure is not limited to the aforementioned examples, and the sensing information may all include information obtained using the sensor and information determined based on the information obtained using the sensor. In operation 303, the device may determine a sensing blind zone in the sensing zone, based on the sensing information. The device may identify a sensing blind zone in the sensing zone, based on the sensing information.

According to some example embodiments, after the device obtains the sensing information, the device may determine which part of the sensing zone is not included in the sensing zone. According to some embodiments, the device may identify which part of the sensing zone is not included in the sensing zone. For example, the device may determine that information about an upper right zone among an entire portion of the sensing zone is omitted or is distorted over a preset reference, the device may determine the upper right zone to be the sensing blind zone.

That is, the device may obtain and analyze the sensing information about the entire portion of the sensing zone, and then may determine a zone from among the entire portion of the sensing zone to be the sensing blind zone, the zone corresponding to the omitted information or the distorted information.

According to some example embodiments, the device may determine a position and a size of the sensing blind zone in the sensing zone. According to some embodiments, the device may identify a position and a size of the sensing blind zone in the sensing zone. That is, the device may determine, based on the obtained sensing information, a position and a size of at least one zone in the sensing zone from which information cannot be obtained.

According to some example embodiments, the device may receive sensing information about another object from the other object. That is, the device may receive the sensing information obtained by the other object, and may use both the received sensing information and the sensing information obtained by the device. In addition, the device may transmit the obtained sensing information to the other device.

According to some example embodiments, the sensing information obtained from the other object may be information about a sensing blind zone. That is, because surroundings around each object are different from one another, a sensing blind zone corresponding thereto may be different from one another. Thus, by exchanging sensing information among objects, a sensing blind zone of each object may be decreased. This will be described in greater detail below with reference to FIG. 6.

In addition, the device may obtain situation information from an external device. In that case that a sensing blind zone has occurred, the device may consider not only the sensing information but also consider the situation information.

In operation 305, the device may generate a control signal, based on the sensing blind zone. According to some embodiments, the control signal may be configured to control at least one of a speed of the object, a direction of the object, a path of the object, a direction of at least one lamp, an angle of at least one lamp, and intensity of at least one lamp. The control signal is not limited thereto, and thus may include a signal for controlling all operations of the object, the operations including generation of an alarm message, an output of the alarm message, or the like.

According to some embodiments, the device may generate the control signal based on the position of the sensing blind zone and the size of the sensing blind zone. For example, in the case that the sensing blind zone is present at the right in the sensing zone, the device may change a path direction of the object to the left (e.g., a lane change).

In the case that the sensing blind zone is larger than a preset range, the device may significantly reduce a speed or may control a direction or an angle of a lamp to head for the sensing blind zone. In addition, the device may output an alarm message via a speaker or a beam toward the sensing blind zone.

The device may generate the control signal, in consideration of both the sensing blind zone and sensing information that is received from and obtained by another object. In addition, the device may generate the control signal, in consideration of both the sensing information and situation information received from an external device. The device may consider all of the sensing information, the situation information, and the sensing information received from the other object or the other device, or may set priorities thereto and then may consider the priorities.

In operation 307, the device may control driving of the object using the generated control signal. The device may directly control the object by generating the control signal, or may control the object by providing the control signal to a separate device (e.g., an electronic control unit (ECU) in a car) configured to control the object.

According to some example embodiments, the device may control at least one of a speed of the object, a direction of the object, a path of the object, a direction of at least one lamp, an angle of at least one lamp, and intensity of at least one lamp by providing an alarm message generated using the generated control signal.

For example, the device may generate the control signal for generating and outputting the alarm message, may generate the alarm message using the generated control signal, and may output the generated alarm message. The device may guide a user input by outputting the alarm message, and may control the object, based on the user input.

According to some example embodiments, the device may predict a movement trajectory of at least one object, based on sensing information, and may provide alarm information to the at least one object, based on information about the predicted movement trajectory.

For example, the device may predict the movement trajectory of the at least one object by detecting the at least one object, based on the sensing information and obtaining information about a position of the detected at least one object. According to a result of the prediction, the device may provide the alarm message or may generate the control signal for providing the alarm message.

Figure 4:
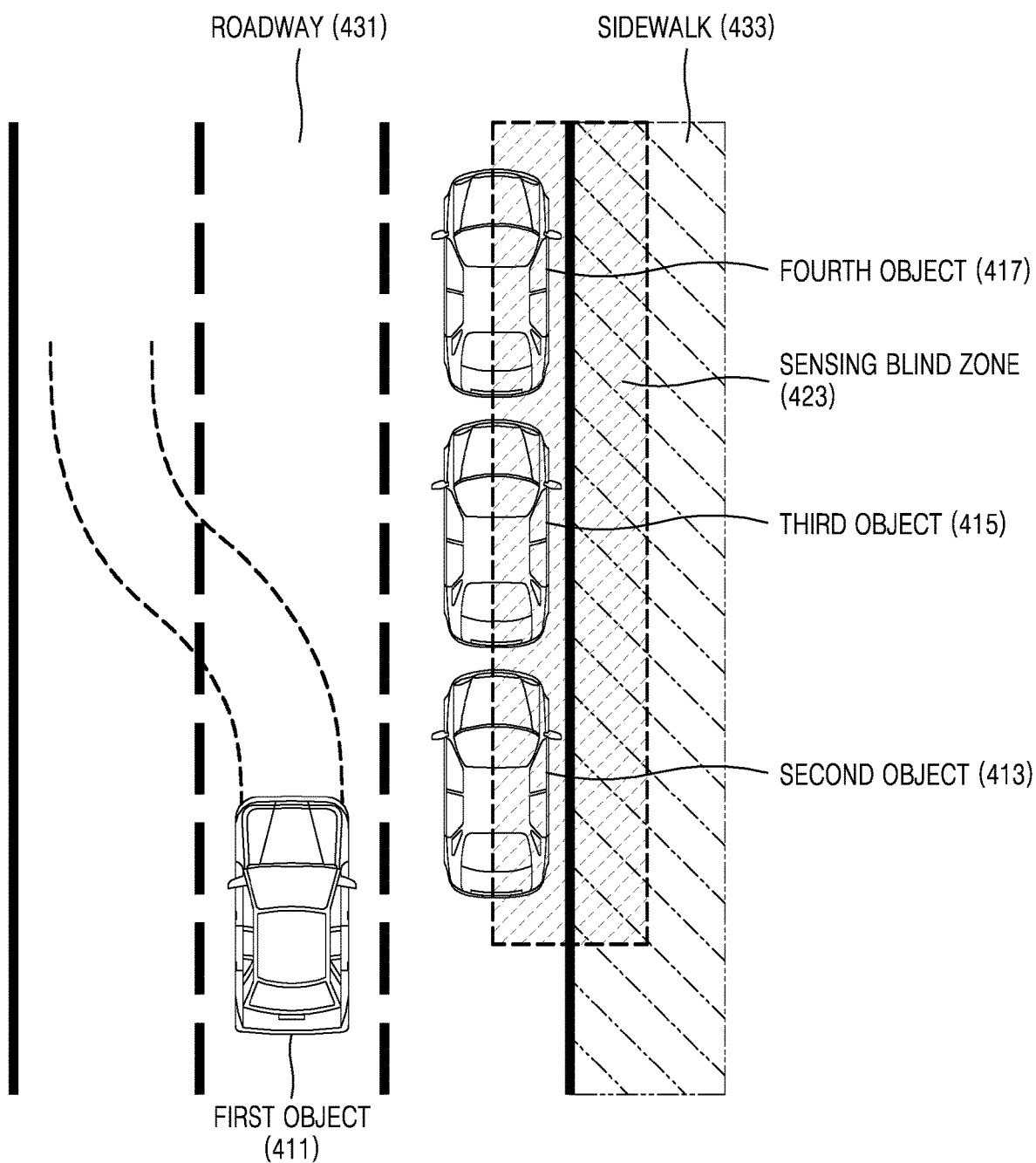
FIG. 4 is a diagram illustrating a method of controlling driving, based on a sensing blind zone, according to some embodiments.

FIG. 4 is a diagram illustrating a method of controlling driving, based on a sensing blind zone, according to some example embodiments.

FIG. 4 illustrates a roadway 431 and a sidewalk 433. The roadway 431 of FIG. 4 includes, for example, three traffic lanes. From the left, the three traffic lanes are sequentially a first lane, a second lane, and a third lane, and in this regard, the third lane contacts the sidewalk 433. The roadway 431 may be a road on which cars may move, and the sidewalk 433 may be a road on which at least one pedestrian may pass by.

Referring to FIG. 4, a first object 411 is driving on the roadway 431. A second object 413, a third object 415, and a fourth object 417 are parked or stopped on the third lane that is the outermost lane of the roadway 431. That is, FIG. 4 illustrates a common situation in driving.

According to some example embodiments, the first object 411 may obtain sensing information using a sensor of the first object 411. The first object 411 may indicate a device included in the first object 411.

Because the second through fourth objects 413 through 417 are parked or stopped on the third lane of the roadway 431, even if the device uses the sensor included in the first object 411, the device cannot obtain sensing information about the sidewalk 433 and a right zone of the second through fourth objects 413 through 417.

For example, the sidewalk 433 and the right zone of the second through fourth objects 413 through 417 correspond to a sensing blind zone 423 from which the first object 411 cannot obtain sensing information. The first object 411 may determine the sensing blind zone 423 and may control driving.

According to some example embodiments, the first object 411 may change a path, based on a position of the sensing blind zone 423. Referring to FIG. 4, the sensing blind zone 423 is present at the right with respect to the first object 411, thus, the first object 411 may change a lane to the first lane. By changing the path to a left lane, the first object 411 may change its path to drive on another path that is farthest from the sensing blind zone 423.

According to some example embodiments, the first object 411 may reduce a speed. For example, in the case that the sensing blind zone 423 is present within a preset distance, the first object 411 may reduce a driving speed or may limit a maximum speed.

According to some example embodiments, the first object 411 may change at least one of a direction, an angle, and intensity of a lamp. For example, the first object 411 may change the direction or the angle of the lamp to the sensing blind zone 423, may broaden an area illuminated by the lamp, by controlling the lamp, or may adjust the intensity of the lamp. According to some embodiments, the first object 411 may output an alarm message. A risk of an accident may be decreased by broadcasting the alarm message to the object that may be in the sensing blind zone 423. For example, the first object 411 may output the alarm message in the form of at least one of sound, light, and a beam.

In addition, the first object 411 may obtain sensing information from the second through fourth objects 413 through 417. That is, because the second through fourth objects 413 through 417 may obtain sensing information about the sensing blind zone 423, the first object 411 may obtain the sensing information from the second through fourth objects 413 through 417. This obtainment will be described in greater detail below with reference to FIG. 6.

Figure 5:
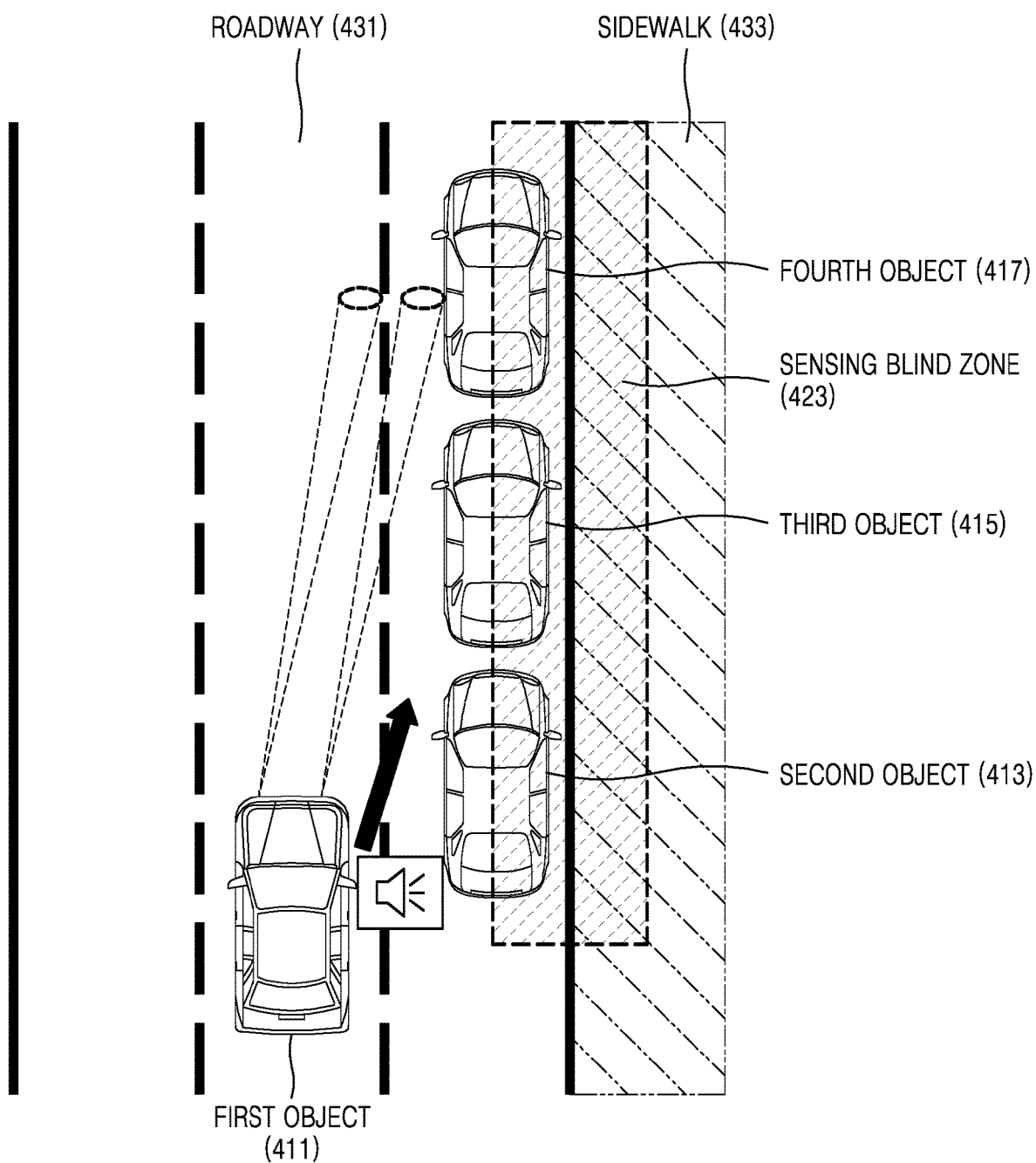
FIG. 5 is a diagram illustrating a method, performed by an object, of controlling a lamp and outputting an alarm message, according to some embodiments.

FIG. 5 is a diagram illustrating a method, performed by the first object 411, of controlling a lamp and outputting an alarm message, according to some example embodiments.

Referring to FIG. 5, as in FIG. 4, the first object 411 is driving on the roadway 431. Also, the second object 413, the third object 415, and the fourth object 417 are parked or stopped on the third lane that is the outermost lane of the roadway 431.

According to some example embodiments, the first object 411 may obtain sensing information using a sensor of the first object 411. However, because the second through fourth objects 413 through 417 are parked or stopped on the third lane of the roadway 431, even if the device uses the sensor included in the first object 411, the device cannot obtain sensing information about the sidewalk 433 and the right zone of the second through fourth objects 413 through 417.

According to some example embodiments, when the sensing blind zone 423 is positioned in a sensing zone of the first object 411, the first object 411 may control a lamp of the first object 411. For example, the first object 411 may control an angle of the lamp to be adjusted toward the sensing blind zone 423. In addition, the first object 411 may broaden an area illuminated by the lamp, by controlling the lamp.

According to some example embodiments, the first object 411 may adjust an intensity of the lamp or flickering of the lamp, and may also display a stop signal, a car approach signal, or the like by controlling the lamp to make a preset form.

In addition, the first object 411 may output the alarm message toward the sensing blind zone 423 via a speaker or a beam. For example, the first object 411 may deliver a preset signal to a pedestrian who may be in the sensing blind zone 423 by outputting warning sound, a car approach signal, or the like using a speaker arranged at the first object 411, or by emitting a beam onto a road or to another object positioned on the road.

The first object 411 may output alarm sound of the speaker toward the sensing blind zone 423 by adjusting a sound output direction, and may adjust a scale (decibel (dB)) of the alarm sound, but the present disclosure is not limited thereto, and the first object 411 may deliver a preset signal to the pedestrian who may be in the sensing blind zone 423.

Figure 6:
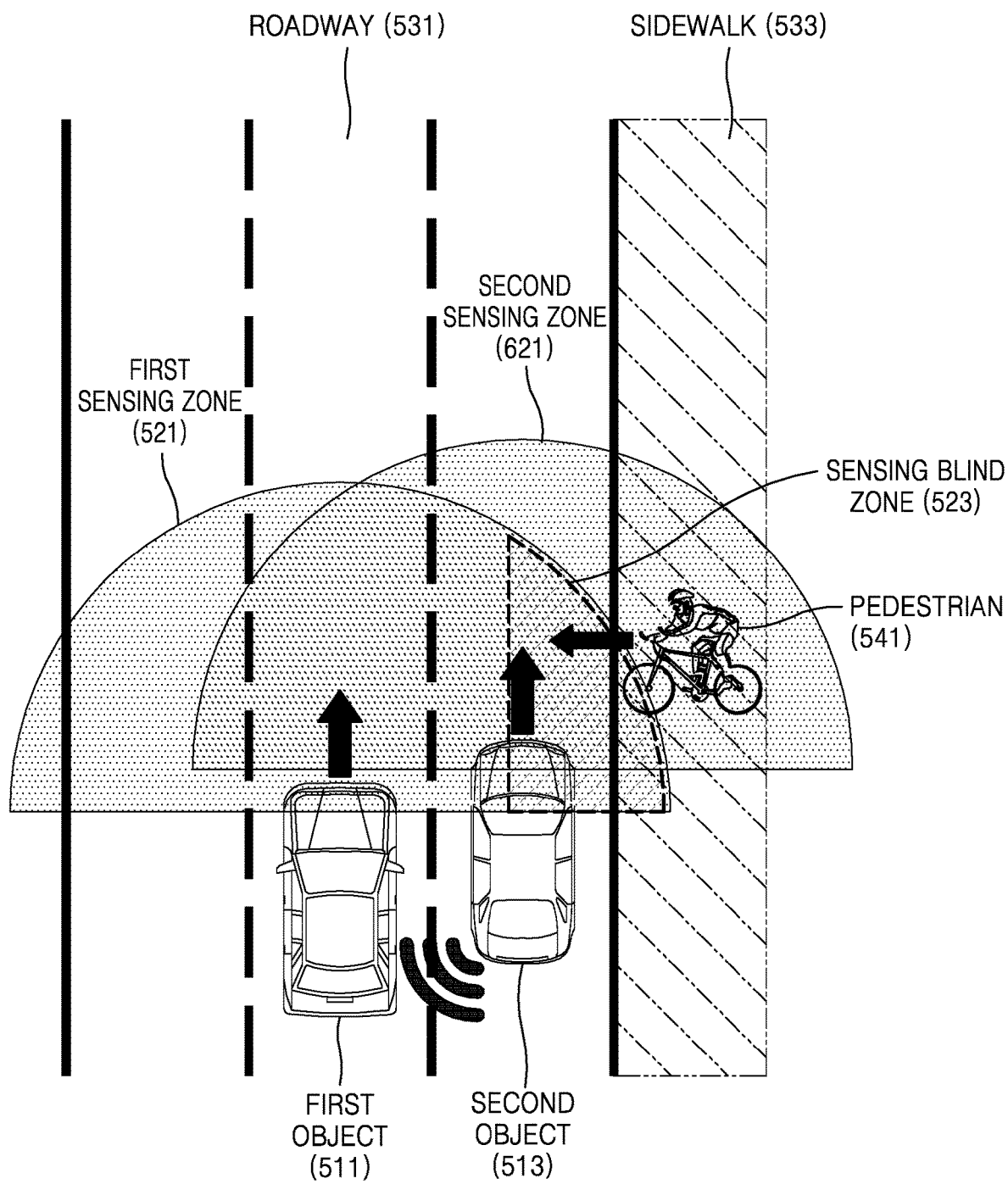
FIG. 6 is a diagram illustrating a method of exchanging sensing information using communication between objects, according to some embodiments.

FIG. 6 is a diagram illustrating a method of exchanging sensing information using communication between objects, according to some example embodiments.

FIG. 6 illustrates a roadway 531 and a sidewalk 533. The roadway 531 of FIG. 6 has three traffic lanes. From the left, the three traffic lanes are sequentially a first lane, a second lane, and a third lane, and in this regard, the third lane contacts the sidewalk 533. Referring to FIG. 6, a first object 511 is driving on the second lane, and a second object 513 is driving on the third lane.

According to some example embodiments, the first object 511 may obtain sensing information using a sensor of the first object 511. The first object 511 may refer, for example, to a device included in the first object 511. A sensing zone from which the first object 511 may obtain the sensing information corresponds to a first sensing zone 521 and has a semicircle with respect to the first object 511.

However, a right zone of the second object 513 is obstructed by the second object 513, thus, the first object 511 cannot obtain sensing information therefrom. That is, the right zone of the second object 513 is included in the first sensing zone 521 but the first object 511 cannot obtain sensing information therefrom, thus, the right zone of the second object 513 is a sensing blind zone 523 of the first object 511.

The second object 513 may also obtain sensing information using a sensor of the second object 513. A sensing zone from which the second object 513 obtains the sensing information is a second sensing zone 621. Unlike the first object 511, a sensing blind zone does not exist in the second sensing zone 621 of the second object 513. That is, because the second object 513 is ahead of the first object 511, a portion of the second sensing zone 621 is not obstructed by the first object 511. Thus, a sensing blind zone of the second object 513 does not exist in this example, and the second object 513 may obtain the sensing information about an entire portion of the second sensing zone 621.

Referring back to FIG. 6, a pedestrian 541 is approaching from the sidewalk 533 to the roadway 531. However, because the pedestrian 541 is in the sensing blind zone 523 of the first object 511, the first object 511 cannot obtain information about the pedestrian 541, thus, a risk of an accident may be high.

Thus, the first object 511 may receive, from the second object 513, the sensing information obtained by the second object 513 or a device included in the second object 513. The second object 513 may obtain sensing information about an entire portion of the sensing blind zone 523 or a portion of the sensing blind zone 523, in which the first object 511 cannot obtain the sensing information. Thus, the second object 513 may provide the sensing information obtained by the second object 513 to the first object 511.

According to some example embodiments, the first object 511 may receive sensing information by requesting the second object 513 for the sensing information obtained by the second object 513, or may obtain sensing information broadcast by the second object 513, but the present disclosure is not limited thereto. In addition, the first object 511 may transmit, to the second object 513, the sensing information obtained by the first object 511 or the device included in the first object 511.

The first object 511 may generate a control signal, based on the sensing information obtained by the first object 511 and the sensing information that is obtained by the second object 513 and is received from the second object 513, and may control driving, based on the generated control signal. Referring to FIGS. 5 and 6, the first object 511 having received the sensing information obtained by the second object 513 can recognize that the pedestrian 541 is located on the sidewalk 533, thus, the first object 511 may change a path or reduce a speed.

Figure 7:
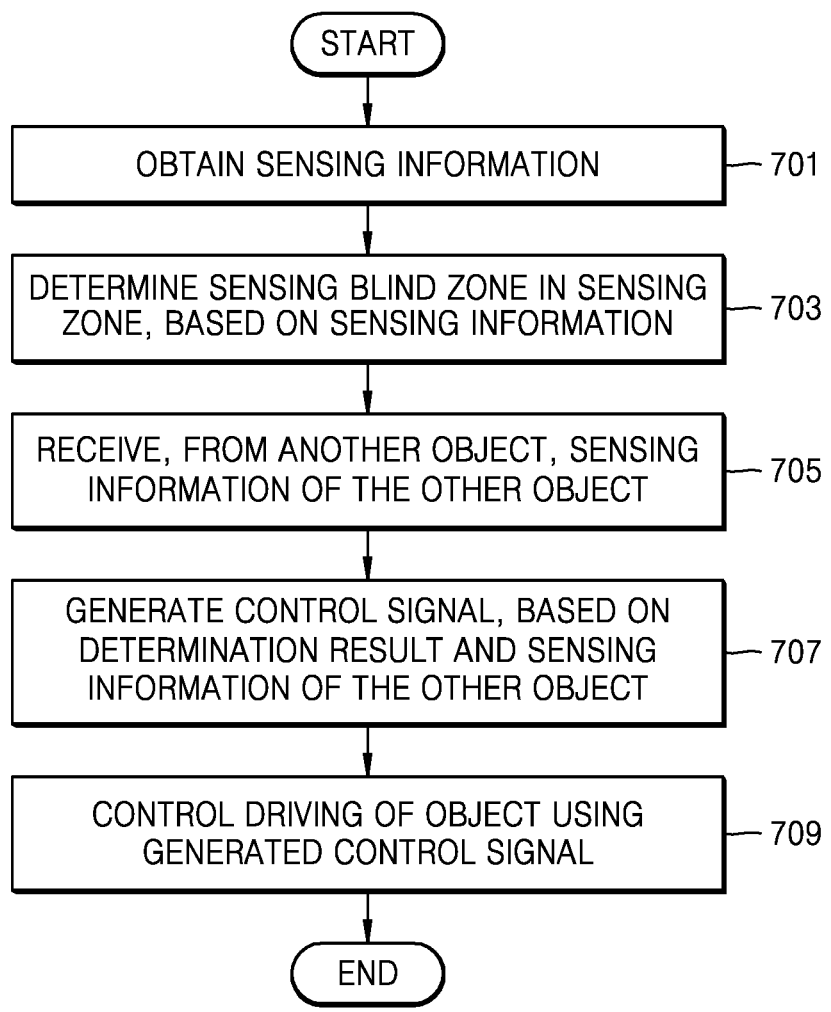
FIG. 7 is a flowchart illustrating a method of controlling driving using communication between objects, according to some embodiments.

FIG. 7 is a flowchart illustrating a method of controlling driving using communication between objects, according to some example embodiments.

In operation 701, a device may obtain sensing information.

In operation 703, the device may determine a sensing blind zone in a sensing zone, based on the sensing information. Operations 701 through 703 correspond to the aforementioned descriptions and thus are not described in detail here.

In operation 705, the device may receive, from another object, sensing information of the other object. According to some embodiments, the sensing information of the other object may include sensing information obtained by the other object or a device included in the other object. The other object may indicate another car.

According to some example embodiments, the device may request the other object for the sensing information of the other object. The other object may receive the request and may transmit, to the device, the sensing information obtained by the other object.

According to some example embodiments, in operation 703, when the device determines that the sensing blind zone does not exist, the device may not receive the sensing information of the other object from the other object.

According to some example embodiments, when a plurality of objects exist around the device, the device may select an object who is most likely to have information about the sensing blind zone, and may request the object to transmit sensing information obtained by the primarily-selected object. For example, when a truck and a bus are present around the device, and the bus has a high probability that the bus has information about the sensing blind zone of the device, the device may request the bus, in priority over the truck, to transmit sensing information.

According to some example embodiments, the device may obtain the sensing information of the other object, based on a position of the sensing blind zone. For example, the device may obtain coordinate information of the sensing blind zone, and may receive, from the other object, sensing information about only the sensing blind zone that corresponds to the coordinate information. That is, the device may receive, from the other object, only sensing information that the device did not obtain.

In addition, the device may directly communicate with the other object or may indirectly communicate with the other object via a third object or an external device. There is no limit in a communication method performed between the device and the other device. The communication method may include all types of communications including predetermined communication standards, predetermined frequency bands, predetermined protocols, communication via predetermined channels, or the like. For example, the communication method may include, but is not limited to, Wi-Fi, Bluetooth, Bluetooth Low Energy (BLE), Zigbee, third-generation (3G), Long-Term Evolution (LTE), near-field communication (NFC), communication performed using ultrasound, short-range communication, and long-range communication, or the like.

According to some example embodiments, the short-range communication may refer to a communication scheme by which communication is available only when two devices to perform communication are present within a predetermined range, and examples of the short-range communication may include Bluetooth, BLE, NFC, or the like, but are not limited thereto.

The long-range communication may refer to a communication scheme by which communication is available between two devices, regardless of a distance therebetween. For example, the long-range communication may refer to communication via a relay station such as an access point (AP), in which two devices can communicate with each other even if a distance between the two devices exceeds a predetermined distance, and may include a communication scheme such as a short message service (SMS), a telephone, etc., which use a cellular network. The present disclosure is not limited thereto, and the long-range communication may include all communication schemes excluding the short-range communication.

In operation 707, the device may generate a control signal, based on the determination result and the sensing information of the other object. That is, the device may generate the control signal, based on not only the sensing information obtained in operations 701 through 703 but also based on the sensing information of the other object which is received from the other object.

In operation 709, the device may control driving of an object including the device using the generated control signal. The descriptions thereof correspond to the aforementioned descriptions and thus are not repeated here.

Figure 8:
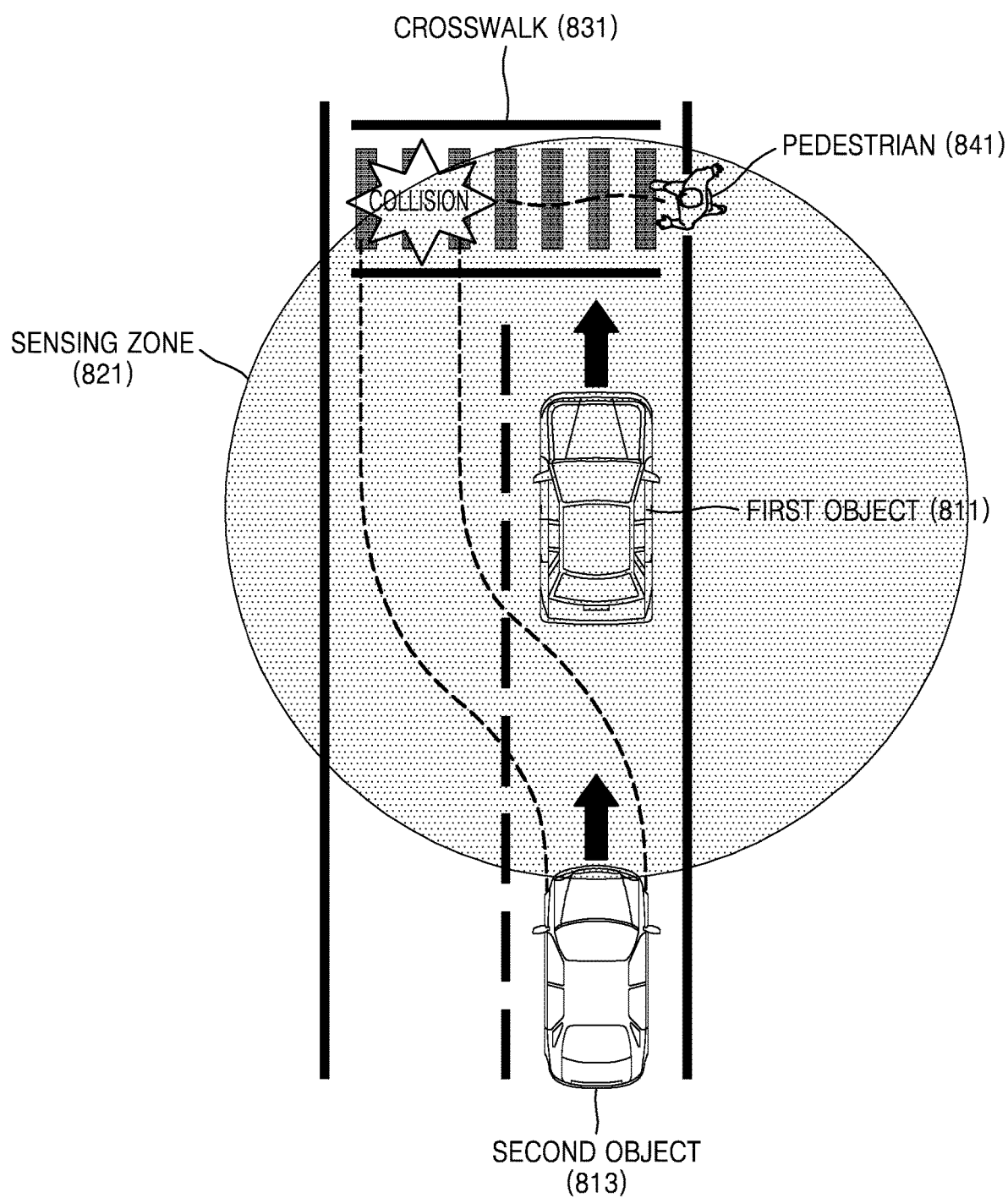
FIG. 8 is a diagram illustrating prediction of a movement trajectory which is performed by tracking a position, based on view-based sensing information, according to some embodiments.

FIG. 8 is a diagram illustrating an example of prediction of a movement trajectory which is performed by tracking a position, based on view-based sensing information, according to some example embodiments.

Referring to FIG. 8, a first object 811 may detect, recognize, and track at least one object in a sensing zone 821 using a sensor of the first object 811. The first object 811 may indicate a device included in the first object 811.

For example, the first object 811 may detect an object in the sensing zone 821 using the sensor, may recognize that the object corresponds to a pedestrian 841 and a second object 813, and may track the pedestrian 841 and the second object 813. According to some embodiments, the first object 811 may predict movement trajectories of the pedestrian 841 and the second object 813 by tracking the pedestrian 841 and the second object 813.

For example, the first object 811 may predict a movement trajectory, based on position information of the object in the sensing zone 821. In other words, the first object 811 may obtain coordinate information by which the object has moved, may analyze the coordinate information about the movement, and may predict how or where the object is to move, thereby predicting the movement trajectory of the object.

According to some example embodiments, the first object 811 may predict the movement trajectory of the object, based, for example, and without limitation, on statistics with respect to movement paths or driving patterns according to paths, time bands (including daytime and nighttime), and speeds, or the like. The movement paths or the driving patterns according to paths, time zones (including daytime and nighttime), and speeds may be previously stored in the first object 811 or may be received from an external server.

In addition, according to some example embodiments, the first object 811 may transmit the position information of the object to an external device, and then the external device may predict the movement trajectory and may provide a result of the prediction to the first object 811.

According to some example embodiments, the first object 811 may determine a possibility of collision, based on the predicted movement trajectory, and may transmit an alarm message to the at least one object, based on a result of the determination. This will be described in greater detail below with reference to FIG. 9.

Figure 9:
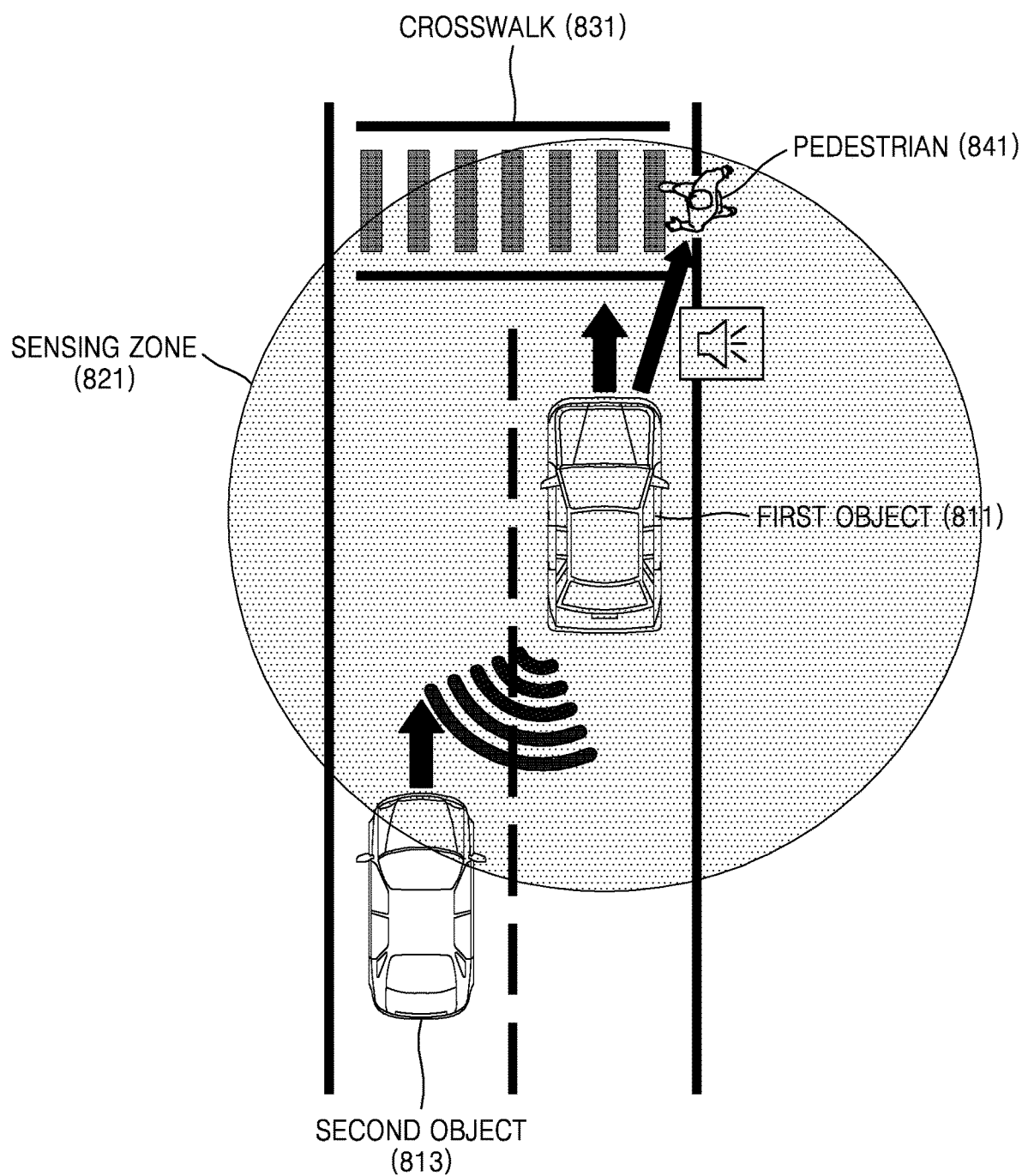
FIG. 9 is a diagram illustrating provision of an alarm message based on prediction of a movement trajectory, according to some embodiments.

FIG. 9 is a diagram illustrating an example of provision of an alarm message based on prediction of a movement trajectory, according to some example embodiments.

As described with reference to FIG. 8, the first object 811 may predict the movement trajectories of the second object 813 and the pedestrian 841, and may determine a possibility of a collision. The first object 811 may predict the movement trajectories of the second object 813 and the pedestrian 841, and may identify a possibility of a collision. According to a result of the determination, the first object 811 may transmit an alarm message to the second object 813 and/or the pedestrian 841.

Compared to FIG. 8, the second object 813 of FIG. 9 is driving on a different traffic lane. That is, the second object 813 is moving on the movement trajectory predicted by the first object 811 in FIG. 8. However, it may be difficult for the second object 813 to detect the pedestrian 841 due to the first object 811. That is, a right zone of the first object 811 may correspond to a sensing blind zone of the second object 813.

When the pedestrian 841 crosses a crosswalk 831, there is a possibility that the pedestrian 841 cannot see the second object 813 due to the first object 811. Thus, there is a risk of an accident. That is, if there is a possibility of a collision based on the predicted movement trajectory, the first object 811 may provide an alarm message to the at least one object to prevent and/or reduce the possibility of the accident.

In addition, the first object 811 may determine a possibility of a collision between the first object 811 and the second object 813 and then may provide an alarm message to the second object 813, and/or may determine a possibility of a collision between the first object 811 and the pedestrian 841 and then may provide an alarm message to a mobile device of the pedestrian 841.

According to some example embodiments, the first object 811 may predict a sensing blind zone of each of objects, based on placement and an angle of the at least one object, and may provide an alarm message, based on the predicted sensing blind zone.

For example, even if there is a possibility of a collision between the pedestrian 841 and the second object 813, if the second object 813 can almost surely detect the pedestrian 841, provision of an alarm message may not be necessary, thus, the first object 811 may not separately provide the alarm message.

According to some embodiments, the first object 811 may provide an alarm message in various manners. For example, and without limitation, the first object 811 may output alarm sound to the pedestrian 841 via a speaker, and may provide an alarm message to the second object 813 via communication. The second object 813 may receive the alarm message from the first object 811 and may output the alarm message to a head-up display (HUD) or a central information display (CID) of the second object 813. Alternatively, the first object 811 may display a warning phrase on a roadway by outputting a beam, or may replace the alarm message by controlling a lamp.

Figure 10:
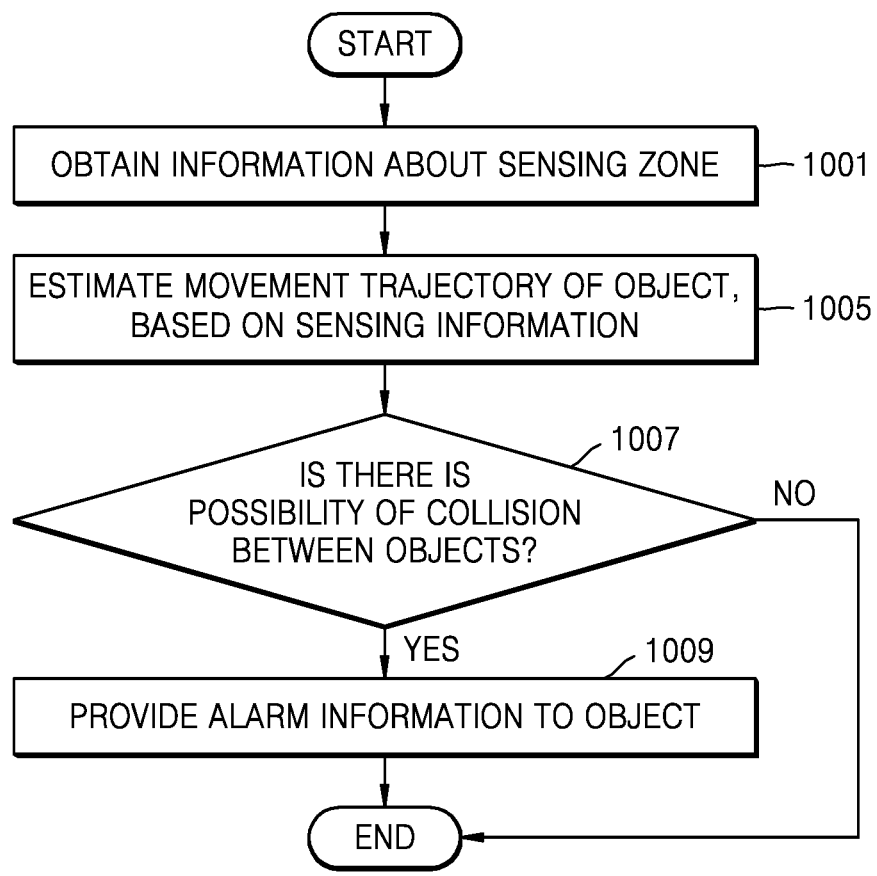
FIG. 10 is a flowchart illustrating a method of providing alarm information using prediction of a movement trajectory, according to some embodiments.

FIG. 10 is a flowchart illustrating a method of providing alarm information using prediction of a movement trajectory, according to some example embodiments.

In operation 1001, a device may obtain information about a sensing zone. The descriptions thereof correspond to the aforementioned descriptions and thus are not repeated here.

In operation 1005, the device may estimate a movement trajectory of an object, based on the sensing information.

According to some example embodiments, the device may detect and identify at least one object in the sensing zone, based on the sensing information. In addition, the device may recognize and track the detected and identified at least one object.

For example, the device may predict the movement trajectory of the object, based on position information about the object in the sensing zone. The device may obtain coordinate information by which the object has moved, may analyze the coordinate information about the movement, and may predict how the object is to move, thereby predicting the movement trajectory of the object.

According to some example embodiments, the device may transmit the position information about the object to an external device, and may receive, from the external device, a movement trajectory of the object which is predicted by the external device. The external device may include an external server.

In operation 1007, the device may determine whether there is a possibility of a collision between objects. The device may identify whether there is a possibility of a collision between objects.

The device may determine whether there is the possibility of a collision between the objects, based on the movement trajectory predicted in operation 1005. For example, in the case that the identified at least one object includes a singular object, the device may determine whether there is a possibility of a collision between the singular object and an object including the device. In the case that the identified at least one object includes a plurality of objects, the device may determine whether there is a possibility of a collision between the plurality of objects.

For example, the device may determine whether there is the possibility of a collision between the plurality of objects, by comparing, for example, and without limitation, predicted movement paths of the plurality of objects, and/or based on at least one of distances between the plurality of objects, respective changes in speeds of the plurality of objects, and respective changes in the distances between the plurality of objects. Thus, even if some trajectories overlap, there may be no possibility of a collision, based on respective movement speeds of objects.

In operation 1009, the device may provide alarm information to the object.

The device may provide alarm information to the at least one object using one of various methods. According to some embodiments, the device may externally output warning sound by controlling a sound output unit such as a speaker, or may display a warning phrase on a roadway by outputting a beam. In addition, the device may adjust a scale or an interval of the warning sound, based on a distance to the object or a movement speed of the object or the device. The device may use a lamp to issue a warning.

The device may provide an alarm message to another object using a preset communication scheme. That is, the device may communicate with the other object via short-range communication or long-range communication, and may communicate with the other object in a direct manner or an indirect manner via another object.

In addition, the device may provide an alarm message to a user of the device. The device may output the alarm message to a HUD or a CID, or may provide the alarm message to the user of the device by generating warning sound in the object including the device.

Figure 11:
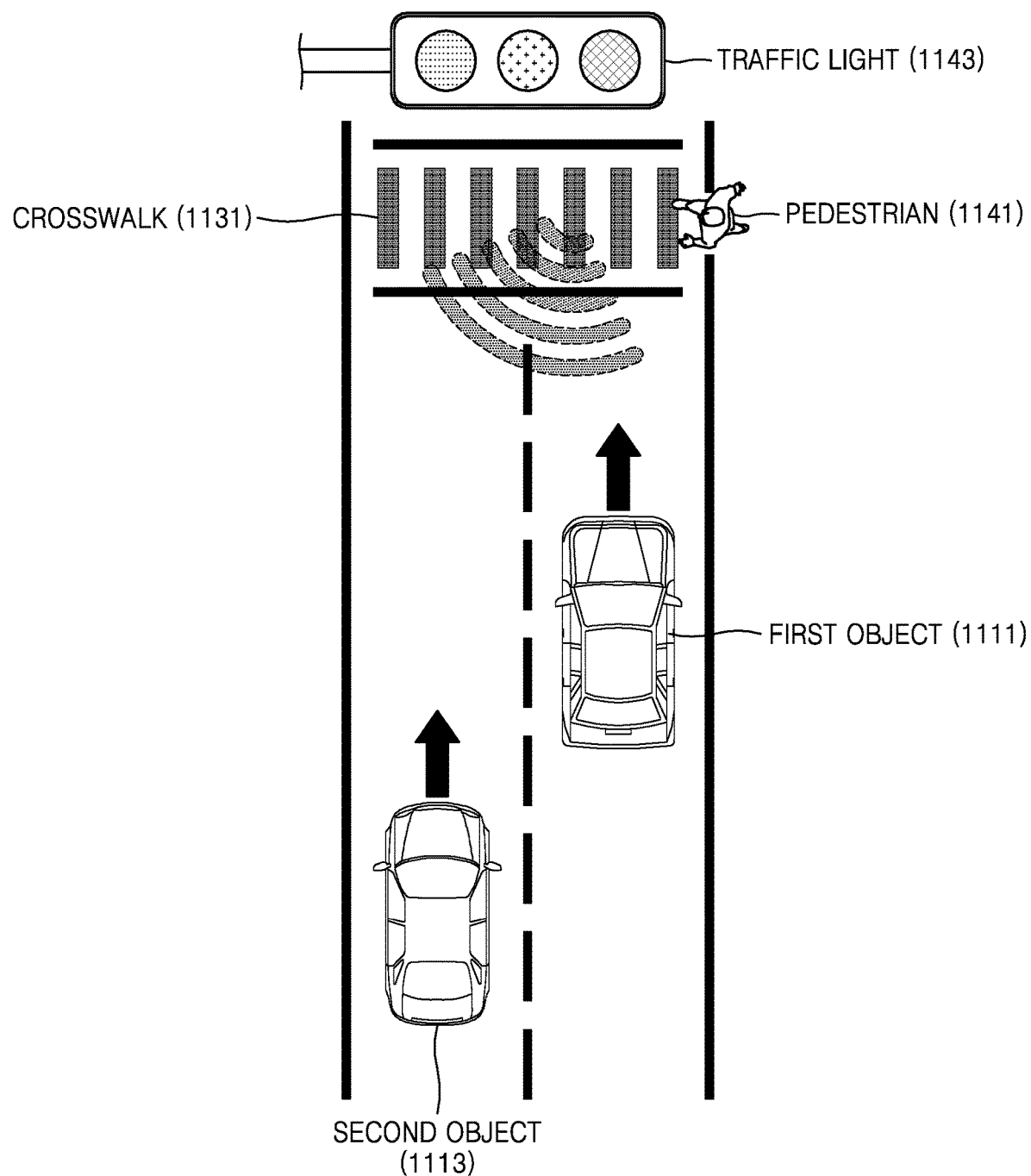
FIGS. 11 and 12 are diagrams illustrating a driving control system based on situation information, according to some embodiments.
Figure 12:
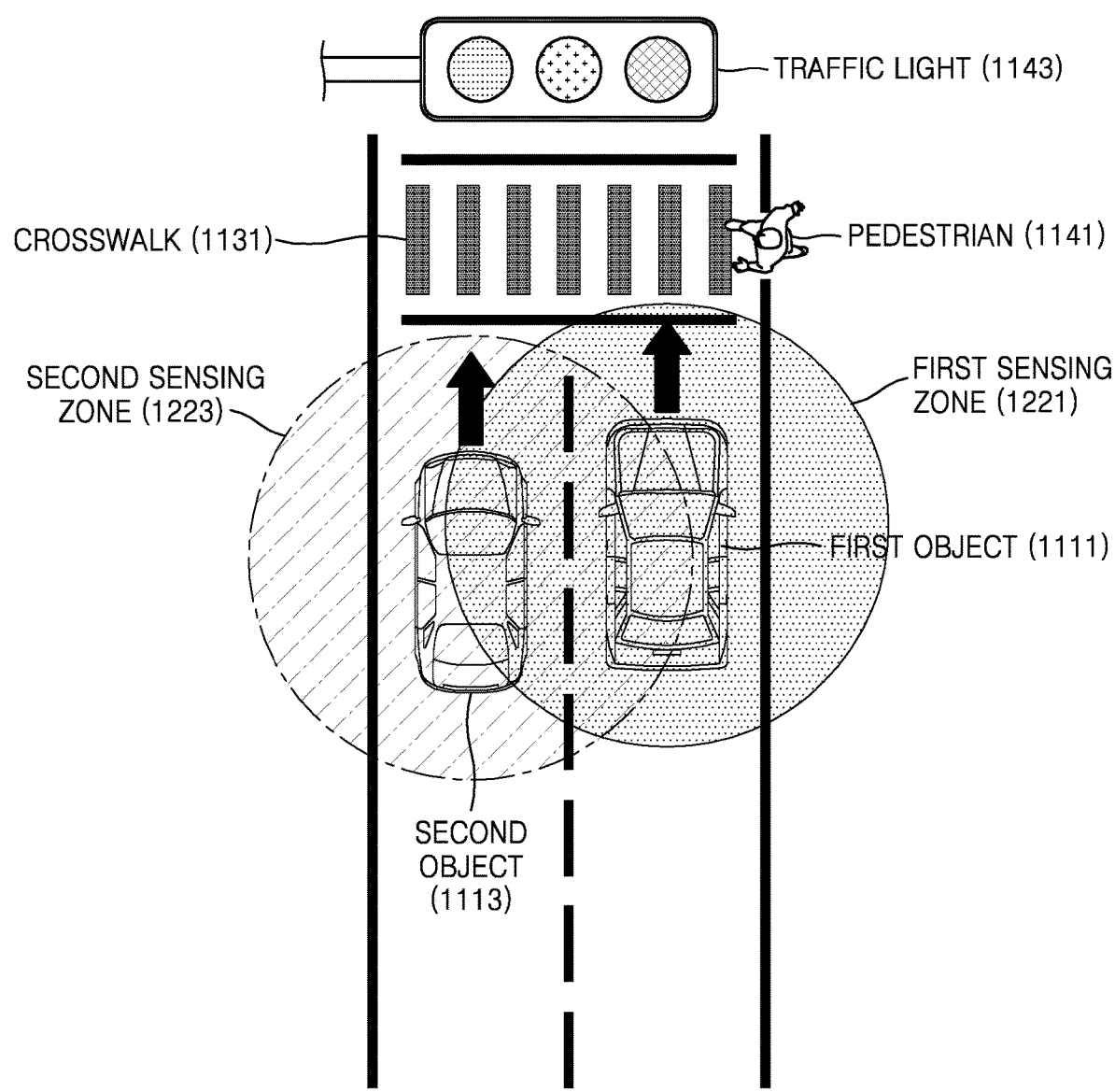

FIGS. 11 and 12 are diagrams illustrating a driving control system based on situation information, according to some example embodiments.

Referring to FIG. 11, a traffic light 1143 is positioned above a crosswalk 1131. The traffic light 1143 of FIG. 11 may be for cars. In addition, the traffic light 1143 may be an external device as infrastructure. The traffic light 1143 that is the external device may obtain situation information from an external device, or may directly obtain the situation information and may broadcast the situation information.

For example, the traffic light 1143 may broadcast at least one of information indicating that a current traffic light within a range of 50 m from a crosswalk or a range of 30 m from an intersection is green and information indicating that the current traffic light is to turn red or yellow in 5 seconds.

A first object 1111 and a second object 1113 may receive the situation information broadcast by the traffic light 1143. After the first object 1111 and the second object 1113 receive the situation information, the first object 1111 and the second object 1113 may recognize that there is not much signal change time left. Thus, the first object 1111 and the second object 1113 may stop in front of the crosswalk 1131 and may each transmit a response to the traffic light 1143.

According to some example embodiments, the first object 1111 and the second object 1113 may respond to the traffic light 1143 right after the first object 1111 and the second object 1113 receive the situation information, or the first object 1111 and the second object 1113 may control driving of the first object 1111 and the second object 1113, based on the situation information, and then may respond to the traffic light 1143.

According to some example embodiments, the first object 1111 and the second object 1113 may transmit an acknowledgement (ACK) signal to the traffic light 1143, or may each transmit a driving control result based on the situation information. For example, the first object 1111 and the second object 1113 may transmit, to the traffic light 1143, information indicating that they stopped in front of the crosswalk 1131.

According to some example embodiments, a mobile device of a pedestrian 1141 may also receive the situation information from the traffic light 1143, and may transmit a response to the traffic light 1143.

Referring to FIG. 12, the traffic light 1143 turns red, and the pedestrian 1141 cross the crosswalk 1131. Then, the first object 1111 and the second object 1113 may track the pedestrian 1141 using their sensors.

According to some example embodiments, in the case that the pedestrian 1141 is detected from a first sensing zone 1221 that is a sensing zone of the first object 1111, but is not detected from a second sensing zone 1223 that is a sensing zone of the second object 1113, the first object 1111 and the second object 1113 may continuously track a position of the pedestrian 1141 by exchanging sensing information.

According to some example embodiments, the traffic light 1143 may also track the pedestrian 1141. The traffic light 1143 may track the pedestrian 1141 using at least one sensor of a camera, a distance sensor, and a proximity sensor. The traffic light 1143 may track the pedestrian 1141 by receiving the sensing information from one of the first object 1111 and the second object 1113, or may track the pedestrian 1141 by tracking a position of the mobile device of the pedestrian 1141 or communicating with the mobile device of the pedestrian 1141.

In the case that the pedestrian 1141 does not completely cross the crosswalk 1131, the traffic light 1143 may broadcast situation information including a signal indicating a danger. Also, the traffic light 1143 may not turn green. For example, even if an estimated time of maintaining a red signal has been over, when the pedestrian 1141 does not completely cross the crosswalk 1131, the traffic light 1143 may not turn green.

Because the first object 1111 and the second object 1113 continuously track the pedestrian 1141, based on sensing information obtained from the first sensing zone 1221 and the second sensing zone 1223, respectively, when the pedestrian 1141 does not completely cross the crosswalk 1131, the first object 1111 and the second object 1113 do not start driving. In addition, even if the first object 1111 and the second object 1113 cannot identify the pedestrian 1141, based on the sensing information, when the first object 1111 and the second object 1113 receive the situation information including the signal indicating a danger from the traffic light 1143, the first object 1111 and the second object 1113 may not start driving.

When the pedestrian 1141 completely crosses the crosswalk 1131, the traffic light 1143 turns green, and the first object 1111 and the second object 1113 may start driving. The traffic light 1143 turns green and may broadcast situation information, and the first object 1111 and the second object 1113 may receive the situation information and then may start driving.

Figure 13:
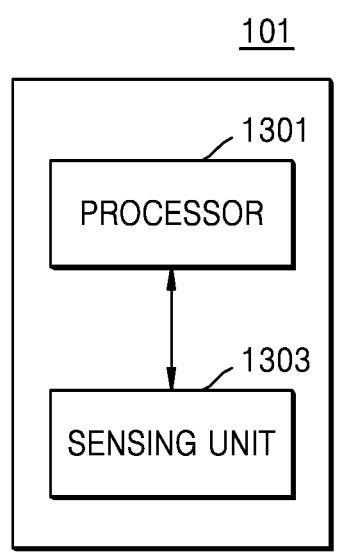
FIG. 13 is a block diagram illustrating a device for controlling driving, based on sensing information, according to some embodiments.

FIG. 13 is a block diagram illustrating a device 101 controlling driving, based on sensing information, according to some example embodiments.

As illustrated in FIG. 13, the device 101 configured to control driving, based on sensing information, may include a processor (e.g., including processing circuitry) 1301 and a sensing unit (e.g., including various sensing circuitry, e.g., sensors) 1303. Throughout the disclosure, a sensing unit 1303 may indicate a group including the aforementioned various sensors. However, not all elements illustrated in FIG. 13 are necessary elements. That is, the device 101 may be embodied with more elements than the shown elements or may be embodied with fewer elements than the shown elements. In addition, as described above, the device 101 may be included in an object or may indicate the object itself.

The processor 1301 may include various processing circuitry and generally controls all operations of the device 101. For example, the processor 1301 may generally control the elements (e.g., the sensing unit 1303) included in the device 101 by executing a program stored in the device 101.

According to some example embodiments, the processor 1301 may determine a sensing blind zone in a sensing zone, based on the sensing information, and may generate a control signal based on the sensing blind zone. In addition, the processor 1301 may control driving of the object using the generated control signal. The processor 1301 may identify a sensing blind zone in a sensing zone, based on the sensing information, and may generate a control signal based on the sensing blind zone.

According to some example embodiments, the processor 1301 may determine a position and a size of at least one zone in the sensing zone, from which information cannot be obtained, based on the sensing information, and may determine the at least one zone to be the sensing blind zone, based on a result of the determination. The processor 1301 may identify a position and a size of at least one zone in the sensing zone, from which information cannot be obtained, based on the sensing information, and may identify the at least one zone to be the sensing blind zone, based on a result of the determination. In other words, the processor 1301 may determine which zone in the sensing zone is the sensing blind zone, based on the sensing information.

According to some example embodiments, the processor 1301 may generate the control signal based on a position of the sensing blind zone and a size of the sensing blind zone. That is, the processor 1301 may change a path, based on the position of the sensing blind zone, or may adjust a speed, based on the size of the sensing blind zone.

The processor 1301 may generate a control signal using the sensing information obtained by the sensing unit 1303 and sensing information of another object which is obtained from the other object. Alternatively, the processor 1301 may generate a control signal using the sensing information obtained by the sensing unit 1303 and sensing information obtained from an external device.

In addition, the processor 1301 may control a speed of the object, a direction of the object, a path of the object, a direction of at least one lamp, an angle of at least one lamp, intensity of at least one lamp, or the like, by providing an alarm message generated using the control signal. The present disclosure is not limited thereto, and the processor 1301 may provide an alarm message using various methods using the control signal.

The control signal may be used in generating the alarm message. That is, the processor 1301 may generate the alarm message using the control signal, and may provide the alarm message to a user by controlling an output unit (not shown), thereby inducing a user input.

According to some example embodiments, the processor 1301 may detect at least one object, based on the sensing information, may obtain information about a position of the detected at least one object, and may predict a movement trajectory of the at least one object, based on the obtained information about a position.

According to some embodiments, the sensing unit 1303 may include various sensing circuitry (e.g., in the form of sensor(s)) to obtain sensing information about the sensing zone. That is, the sensing unit 1303 may obtain object information or driving information, but the present disclosure is not limited thereto.

Figure 14:
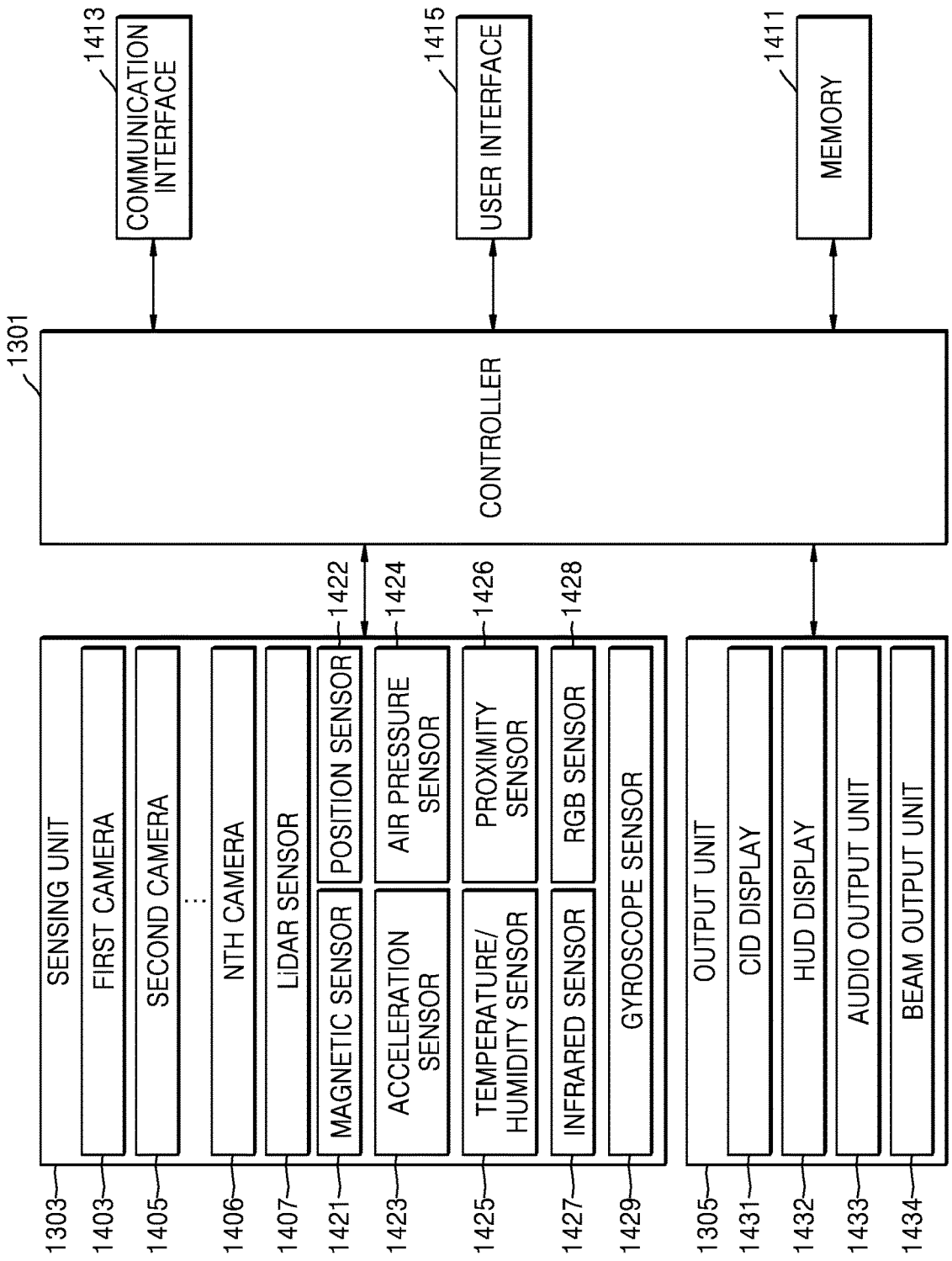
FIG. 14 is a block diagram illustrating the device for controlling driving, based on sensing information, according to some embodiments.

FIG. 14 is a block diagram illustrating the device 101 controlling driving, based on sensing information, according to some example embodiments.

As illustrated in FIG. 14, the device 101 configured to control driving based on sensing information may include the processor 1301 (also referred to as the controller 1301) and the sensing unit 1303 and may further include an output unit (e.g., including output circuitry) 1305, a communication interface (e.g., including communication circuitry) 1413, a user interface 1415, and a memory 1411. However, not all elements illustrated in FIG. 14 are necessary elements. That is, the device 101 may be embodied with more elements than the shown elements or may be embodied with fewer elements than the shown elements.

According to some example embodiments, the processor 1301 may include various processing circuitry and estimate a movement trajectory of at least one object, based on sensing information, and may control the communication interface 1413 and the output unit 1305 to provide alarm information to the at least one object, based on information about the estimated movement trajectory. An operation of the processor 1301 corresponds to what are described above, thus, detailed descriptions are omitted here.

According to some example embodiments, the sensing unit 1303 may include various sensing circuitry, such as, for example, and without limitation, a plurality of cameras, e.g., a first camera 1403, a second camera 1405, . . . and an $n^{th}$ camera 1406, and a LiDAR sensor 1407, or the like. In addition, the sensing unit 1303 may additionally include, but is not limited to, at least one of a magnetic sensor 1421, a position sensor (e.g., a global positioning system (GPS)) 1422, an acceleration sensor 1423, an air pressure sensor 1424, a temperature/humidity sensor 1425, a proximity sensor 1426, an infrared sensor 1427, an RGB sensor (e.g., an illuminance sensor) 1428, and a gyroscope sensor 1429. Functions of the sensors may be intuitionally deduced by one of ordinary skill in the art by referring to names of the sensors, thus, detailed descriptions thereof are omitted here.

According to some example embodiments, the processor 1301 may determine a sensing zone and a sensing blind zone by taking into account sensing ranges of the various sensors arranged in the sensing unit 1303. In addition, the sensing unit 1303 may obtain various types of information, based on the various sensors arranged in the sensing unit 1303. For example, the sensing unit 1303 may obtain information about a shape of an object and a distance between the object and another object by controlling the LiDAR sensor 1407, and may obtain information about a shape of the object by controlling the first and second cameras 1403 and 1405. The present disclosure is not limited thereto.

According to some example embodiments, the output unit 1305 may include various output circuitry, such as, for example, and without limitation, a CID display 1431, a HUD display 1432, an audio output unit (e.g., including audio output circuitry) 1433, and a beam output unit (e.g., including beam output circuitry) 1434, or the like. According to some embodiments, the audio output unit 1433 may include a speaker, and the beam output unit 1434 may include a light emitting diode (LED). In addition, the output unit 1305 may further include a vibration motor (not shown).

According to some example embodiments, the output unit 1305 may output an alarm message using at least one of the CID display 1431, the HUD display 1432, the audio output unit 1433, and the beam output unit 1434. As described above, the output unit 1305 may output the alarm message based on various combinations and in various speeds, by the control of the processor 1301.

The processor 1301 may output speaker alarm sound in a direction to the sensing blind zone by controlling the audio output unit 1433 in the output unit 1305, and may adjust a scale (decibel (dB)) of the alarm sound. The processor 1301 is not limited thereto and may broadcast a preset signal to a pedestrian who may be present in the sensing blind zone.

In addition, the processor 1301 may control at least one of a speed of the object, a direction of the object, a path of the object, a direction of at least one lamp, an angle of at least one lamp, and intensity of at least one lamp by providing, via the output unit 1305, the alarm message that is generated using the control signal. In other words, the processor 1301 may provide the alarm message by controlling the output unit 1305, and may control driving by receiving a user input via the user interface 1415.

According to some example embodiments, the memory 1411 may store a program for processing and controlling the processor 1301 and/or the communication interface 1413, and may store data input to and/or output from the device 101.

According to some example embodiments, the memory 1411 may include at least one of storage mediums including a flash memory type storage medium, a hard disk type storage medium, a multimedia card micro type storage medium, a card-type memory (e.g., a secure digital (SD) memory, an xD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disc, and an optical disc.

According to some example embodiments, the communication interface 1413 may include various communication circuitry and perform communication with another object, an external device, or an external server. That is, the communication interface 1413 may receive information that other elements in the device 101 have to obtain from the other object, the external device, or the external server using various frequency bands and various communication methods.

For example, the communication interface 1413 may obtain situation information by communicating with the external device, may receive situation information of the other object by communicating with the other object, and may transmit the sensing information obtained by the sensing unit 1303. As described above, the communication interface 1413 may receive, from the other object, sensing information about the sensing blind zone from which the sensing unit 1303 cannot obtain sensing information.

In addition, the communication interface 1413 may transmit alarm information to the other object, based on a movement trajectory predicted by the processor 1301.

The communication interface 1413 may include modules including various communication circuitry configured to perform communication using various communication schemes in various communication bands. For example, the communication interface 1413 may include, but is not limited to, a Bluetooth communication interface, a BLE communication interface, an NFC communication interface, a wireless local area network (WLAN) (Wi-Fi) communication interface, a Zigbee communication interface, an infrared Data Association (IrDA) communication interface, a Wi-Fi Direct (WFD) communication interface, a ultra wideband (UWB) communication interface, an Ant+ communication interface, a 3G communication interface, an LTE communication interface, a Transport Protocol Expert Group (TPEG) communication interface, or a digital multimedia broadcasting (DMB).

According to some example embodiments, the user interface 1415 may include various circuitry and/or program elements configured to obtain a user input. For example, the user interface 1415 may receive, but is not limited to, a user input via a joystick, a touchscreen, a touchpad, a button, a voice, or the like.

The various example embodiments may minimize and/or reduce uncertainty due to a sensing blind zone, thereby increasing safety of a driver.

The example\embodiments of the present disclosure may include a processor, a memory for storing and executing program data, a non-transitory storage including a disk drive, a communication port for communication with an external device, a user interface device including a touch panel, a key, a button, and the like. The methods embodied as a software module or an algorithm may be stored as computer-readable codes or program commands that are executable on the processor in a non-transitory computer-readable recording medium. The non-transitory computer-readable recording medium is any data storage device that can store data which can be thereafter read by a computer system. Examples of the non-transitory computer-readable recording medium include magnetic storage media (e.g., ROMs, RAMs, floppy disks, hard disks, etc) and optical reading media including CD-ROMs, DVDs, etc. The non-transitory computer-readable recording medium can also be distributed over network-coupled computer systems so that the computer-readable code is stored and executed in a distributed fashion. The media can be read by computers, can be stored in the memory, and can be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference numerals have been used in the embodiments illustrated in the drawings, and specific language has been used to describe these embodiments. However, no limitation of the scope of the disclosure is intended by this specific language, and the disclosure should be understood to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations illustrated and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various drawings presented are intended to represent example functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context.

The use of any and all examples, or example language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope of the present disclosure.

What is claimed is:

1. A method of controlling driving, based on sensing information obtained by a device included in an object, comprising:
   obtaining sensing information;
   determining a sensing blind zone in a sensing zone, based on the sensing information;
   generating a control signal, based on the sensing blind zone; and
   controlling driving of the object using the control signal so that the driving of the object is controlled based on a size and/or location of the determined sensing blind zone.

2. The method of claim 1, wherein the determining of the sensing blind zone comprises:
   determining, based on the sensing information, a position and a characteristic of at least one partial zone in the sensing zone, wherein information cannot be obtained from the at least one partial zone; and
   determining the at least one partial zone to be the sensing blind zone, based on the determining.

3. The method of claim 1, wherein the generating comprises generating the control signal, based on a position of the sensing blind zone and a characteristic of the sensing blind zone.

4. The method of claim 1, wherein the controlling of the driving of the object comprises controlling at least one of: a speed of the object, a direction of the object, a path of the object, a direction of at least one lamp of the object, an angle of the at least one lamp, and an intensity of the at least one lamp by providing an alarm message generated using the control signal.

5. The method of claim 1, further comprising receiving, from another object, sensing information of the other object, and
   wherein the generating of the control signal comprises generating the control signal, based on a result of the determining and the sensing information of the other object.

6. The method of claim 5, wherein the sensing information of the other object which is obtained by the other object, comprises information about the sensing blind zone.

7. The method of claim 6, further comprising transmitting, to the other object, the sensing information obtained by the device.

8. The method of claim 1, further comprising obtaining situation information from an external device, and
wherein the generating of the control signal comprises generating the control signal, based on the sensing blind zone and the situation information.

9. The method of claim 1, further comprising:
estimating a movement trajectory of the object based on the sensing information; and
providing alarm information to the object based on information about the movement trajectory.

10. The method of claim 9, wherein the estimating comprises:
detecting the object based on the sensing information;
obtaining information about a position of the detected object; and
predicting the movement trajectory of the object based on the information about the position.

11. A non-transitory computer-readable recording medium having recorded thereon a program for executing the method of claim 1 using a computer.

12. A device controlling driving of an object comprising a vehicle, based on sensing information, the device comprising:
a sensing unit comprising sensing circuitry configured to obtain sensing information; and
a processor configured to determine a sensing blind zone in a sensing zone based on the sensing information, to generate a control signal based on the sensing blind zone, and to control driving of the object using the control signal so that the driving of the object is controlled based on a size and/or location of the determined sensing blind zone.

13. The device of claim 12, wherein the processor is further configured to:
determine, based on the sensing information, a position and a characteristic of at least one partial zone in the sensing zone, wherein information cannot be obtained from the at least one partial zone, and
determine the at least one partial zone to be the sensing blind zone based on a result of the determination.

14. The device of claim 12, wherein the processor is further configured to generate the control signal based on a position of the sensing blind zone and a characteristic of the sensing blind zone.

15. The device of claim 12, further comprising an output unit comprising output circuitry, and
wherein the processor is further configured to control at least one of: a speed of the object, a direction of the object, a path of the object, a direction of at least one lamp of the object, an angle of the at least one lamp, and an intensity of the at least one lamp by providing an alarm message generated using the control signal via the output unit.

16. The device of claim 12, further comprising a communication interface comprising communication circuitry configured to receive, from another object, sensing information of the other object, and
wherein the processor is further configured to generate the control signal based on a result of the determination and the sensing information of the other object.

17. The device of claim 16, wherein the sensing information of the other object which is obtained by the other object comprises information about the sensing blind zone.

18. The device of claim 17, wherein the communication interface is further configured to transmit, to the other object, the sensing information obtained by the device.

19. The device of claim 12, further comprising a communication interface comprising communication circuitry configured to obtain situation information from an external device, and
wherein the processor is further configured to generate the control signal based on the sensing blind zone and the situation information.

20. The device of claim 12, further comprising:
a communication interface comprising communication circuitry; and
an output unit comprising output circuitry, and
wherein the processor is further configured to control the communication interface and the output unit and to estimate a movement trajectory of the object based on the sensing information, and to provide alarm information to the object based on information about the movement trajectory.

* * * * *